US011077531B2

(12) United States Patent
Chang

(10) Patent No.: US 11,077,531 B2
(45) Date of Patent: Aug. 3, 2021

(54) FIXTURE BLOCK COMPOSITE STRUCTURE FOR WORKPIECE POSITIONING

(71) Applicant: Chun-Wei Chang, New Taipei (TW)

(72) Inventor: Chun-Wei Chang, New Taipei (TW)

( * ) Notice: Subject to any disclaimer, the term of this patent is extended or adjusted under 35 U.S.C. 154(b) by 173 days.

(21) Appl. No.: 16/175,841

(22) Filed: Oct. 31, 2018

(65) Prior Publication Data

US 2019/0152006 A1    May 23, 2019

(30) Foreign Application Priority Data

Nov. 17, 2017    (TW) .................................. 106217109

(51) Int. Cl.
*B23Q 3/06*        (2006.01)
*B25B 1/02*        (2006.01)
*B25B 1/24*        (2006.01)
*B25B 1/08*        (2006.01)

(52) U.S. Cl.
CPC ................ *B23Q 3/062* (2013.01); *B25B 1/02* (2013.01); *B23Q 3/061* (2013.01); *B23Q 2703/08* (2013.01); *B23Q 2703/10* (2013.01); *B25B 1/08* (2013.01); *B25B 1/2473* (2013.01); *B25B 1/2478* (2013.01); *B25B 1/2489* (2013.01)

(58) Field of Classification Search
CPC .......... B23Q 1/42; B23Q 3/103; B23Q 3/104; B23Q 3/06; B23Q 3/066; B23Q 3/062; B23Q 3/061; B23Q 2703/08; B23Q 2703/10; B25B 1/00; B25B 1/02

USPC ............................................. 269/43, 45, 156
See application file for complete search history.

(56) References Cited

U.S. PATENT DOCUMENTS

| 2,625,861 | A | * | 1/1953  | Swanson   | B25B 1/08  |
|           |   |   |         |           | 269/157    |
| 4,489,927 | A | * | 12/1984 | Yamada    | B23Q 3/102 |
|           |   |   |         |           | 269/137    |
| 4,643,411 | A | * | 2/1987  | Izumi     | B25B 5/08  |
|           |   |   |         |           | 269/138    |
| 5,056,766 | A | * | 10/1991 | Engibarov | B25B 5/08  |
|           |   |   |         |           | 269/136    |
| 5,226,637 | A | * | 7/1993  | Kitaura   | B25B 5/08  |
|           |   |   |         |           | 269/234    |
| 5,324,013 | A | * | 6/1994  | Marino    | B25B 1/08  |
|           |   |   |         |           | 269/137    |
| 6,126,158 | A | * | 10/2000 | Engibarov | B25B 5/08  |
|           |   |   |         |           | 269/101    |

(Continued)

FOREIGN PATENT DOCUMENTS

WO    WO-2014171271 A1 * 10/2014 ........... B25B 1/2405

*Primary Examiner* — Michael McCullough

(57) ABSTRACT

A fixture block composite structure for workpiece positioning comprises a fixture block group composed of at least a stop fixture block and at least a one-sided movable fixture block. The stop fixture block is fixed to a base by a plurality of mountings, and two opposite lateral sides of the stop fixture block in the extending direction of base are provided with a fixed upright positioning plane respectively. The one-sided movable fixture block has a fixed holder, the holder is fixed to the base by a plurality of mountings. The holder is provided with a movable piece which can be driven to reciprocate towards the positioning plane on the stop fixture block. The movable piece is provided with a clamping surface on one side facing the positioning plane.

9 Claims, 12 Drawing Sheets

(56) References Cited

U.S. PATENT DOCUMENTS

| | | | | |
|---|---|---|---|---|
| 6,659,439 | B1* | 12/2003 | Baumgartner | B25B 1/12 |
| | | | | 269/137 |
| 8,002,254 | B2* | 8/2011 | Bayer | B23Q 3/102 |
| | | | | 269/305 |
| 8,646,738 | B2* | 2/2014 | Stoob | F16M 7/00 |
| | | | | 248/188.4 |
| 9,481,061 | B2* | 11/2016 | Merilainen | B25B 1/12 |
| 9,844,855 | B1* | 12/2017 | Chen | B25B 1/08 |
| 9,895,792 | B2* | 2/2018 | Chen | B25B 1/241 |
| 10,259,103 | B2* | 4/2019 | Engibarov | B25B 1/00 |
| 2003/0197319 | A1* | 10/2003 | Ho | B25B 5/08 |
| | | | | 269/246 |
| 2015/0336241 | A1* | 11/2015 | Engibarov | B25B 1/12 |
| | | | | 269/281 |
| 2017/0259405 | A1* | 9/2017 | Lin | B25B 1/08 |
| 2020/0156218 | A1* | 5/2020 | Chang | B25B 1/2489 |

* cited by examiner

FIXTURE BLOCK COMPOSITE STRUCTURE FOR WORKPIECE POSITIONING

BACKGROUND OF INVENTION

1. Field of the Invention

This project is a fixture block composite structure for clamping the workpiece and making sure the workpiece is clamped steadily on the machine tool platform.

2. Description of Related Art

In terms of conventional workpiece clamping device (known as vice), one end is a fixed jaw, the other end is a movable jaw, the workpiece can be clamped by the fixed jaw and movable jaw for machining operation. However, only one workpiece can be clamped at a time, inconvenient for work. Other improvement methods came out, two examples are given below.

In Taiwan patent bulletin No. M380192 "vice clamp structure", FIGS. 6 and 7 disclose a workpiece clamping device, but there are the following problems in use.

(1) It has left and right fixtures for clamping the workpiece. A V-shaped clamping block is clamped between the left and right fixtures. The V-shaped clamping block is short of an up homing mechanism, so when the vice loosens the V-shaped clamping block, the travel of the left and right fixtures is very short. The workpiece can be unloaded directly, but the left and right fixtures must be put apart by hand before another workpiece is put in and the clamping block is fastened. It is inconvenient to use.

(2) When the V-shaped clamping block deviates downward, a contact deviation is likely to occur between the clamping block and left and right fixtures, so that the force acting on the left and right fixtures cannot be average, the workpiece is likely to tilt, the stress is overconcentrated, and the life of vice device is shortened.

Secondly, Taiwan patent bulletin No. M380192 "vice clamp structure" discloses an improved fixture structure, but it has the following problems:

(1) A longitudinally extended (opening up) inverted T-slot is located in the center of main body. The inverted T-slot is used to hold the inverted T-piece. When the machine tool machines the workpiece, the metal scraps are likely to fall into the inverted T-slot, so the metal scraps shall be removed from the inverted T-slot constantly, otherwise the movement of the inverted T-piece in the inverted T-slot will be hindered.

(2) The holder and clamping block shall be changed for different workpieces each time, as the inverted T-piece must be put in the inverted T-slot first, it is difficult to align the holders and clamping blocks with the inverted T-piece, the adjustment of the inverted T-piece, holder and clamping block takes time and labor.

SUMMARY OF THE INVENTION

The purpose of the present invention is to overcome the deficiencies of the prior art and to provide a fixture block composite structure for workpiece positioning.

In order to solve the above technical problems, the present invention adopts the following technical solutions:

A fixture block composite structure for workpiece positioning comprising:

a fixture block group including at least a stop fixture block and at least a one-sided movable fixture block, wherein the stop fixture block is fixed to a base by a plurality of side clamping pieces, and two opposite lateral sides of the stop fixture block in the extending direction of base are provided with a fixed upright positioning plane respectively; the one-sided movable fixture block has a holder, the holder is fixed to the base by a plurality of side clamping pieces; the holder is provided with a movable piece which can be driven to reciprocate towards the positioning plane; one side of the movable piece facing the stop fixture block is provided with a clamping surface; the clamping surface can change the distance to the positioning plane by reciprocating with the movable piece, so as to clamp or loosen a workpiece located between the positioning plane and movable piece.

More particularly, the one-sided movable fixture block is a one-sided translational fixture block with one movable piece. The one-sided translational fixture block is provided with a top surface in the upper part of the holder; a stopping part protrudes from a lateral side of the top surface; the movable piece is located on one side far from the stopping part on the top surface; a driving piece is located between the movable piece and stopping part; the driving piece has a big-end-up trapezoidal section, and one side facing the movable piece and stopping part is provided with a driving bevel face and a guide slideway respectively; the stopping part is provided with a stopping bevel face adhering to the guide slideway; there is at least one elastic element between the driving piece and the top surface of holder; the movable piece is provided with an interlocked bevel face adhering to the driving bevel face; a downwards through fisheye long hole is located in the center of top side of the driving piece, and a driving bolt is screwed in the top surface of the holder through the fisheye long hole, the driving bolt is turned to press down the driving piece, so as to form a push between the stopping part and movable piece, the movable piece can be translated away from the stopping part; when the driving bolt is loosened, the driving piece can be pushed up to the home position by the elasticity of the elastic element.

More particularly, wherein the driving piece is provided with an outwards protruding outer hook part on two lateral sides of each driving bevel face respectively, and the movable piece is provided with an inwards protruding inner hook part on two lateral sides of interlocked bevel face respectively; the interlocked bevel face adheres to the driving bevel face as the inner hook part hooks the outer hook part, so that the movable piece and the driving piece act synchronously.

More particularly, wherein the holder is provided with a middle groove extending along the moving path of the movable piece on one side far from the stopping part, a T piece is located in the lower part of the middle groove, the T piece is screwed in the bottom side of the movable piece by a connecting bolt.

More particularly, wherein an intermediate channel extending in the orientation of the fixture block group is located in the intermediate section of top surface of the base; two lateral sides of the intermediate channel are provided with a plurality of equidistantly arranged upper salient teeth; a transversely extending lower side groove is located respectively in the intermediate section of two lateral sides of the base; the center of bottom side of the holder is integrated with a lower baffle; the lower baffle partially protrudes into the intermediate channel, so as to guide the holder to slip along the intermediate channel; a plurality of lower salient teeth which can engage with the upper salient teeth are provided on the bottom surface of the stop fixture block and on two lateral sides of bottom surface of the holder respectively; two lateral sides of the stop fixture block and two lateral sides of the holder are provided with an upper side groove respectively; each side clamping piece is provided with homolaterally protruding lower and upper side bulges; each side clamping piece is extended into the lower and upper side grooves by the lower and upper side bulges respectively and pressed, and the upper salient teeth engage with lower salient teeth, various fixture blocks can be clamped and located in the base by various side clamping pieces.

More particularly, wherein the stopping part of the holder is provided with another upright positioning plane on one side far from the movable piece.

More particularly, wherein the one-sided movable fixture block is a one-sided tilt fixture block with one movable piece; the one-sided tilt fixture block is provided with an oblique recess in the intermediate section of an edge of top side of the holder; a guide slideway is provided on inner lateral side of the oblique recess; a side bulge reaching into the oblique recess protrude transversely from the intermediate section of one side of the movable piece; the side bulge is provided with a bevel face adhering to the guide slideway; at least one elastic element is located between the movable piece and the bottom surface of oblique recess; a downwards through fisheye long hole is located in the center of top side of the movable piece, and a driving bolt is screwed in the bottom of the oblique recess through the fisheye long hole; when the driving bolt is turned to press down the movable piece, the movable piece moves obliquely towards the outside of the oblique recess along the guide slideway; when the driving bolt is loosened, the movable piece is pushed up to the home position by the elasticity of the elastic element.

More particularly, wherein an intermediate channel extending in the orientation of the fixture block group is located, in the intermediate section of top surface of the base; two lateral sides of the intermediate channel are provided with a plurality of equidistantly arranged upper salient teeth; a transversely extending lower side groove, is located respectively in the intermediate section of two lateral sides of the base; the center of bottom side of the holder is integrated with a lower baffle; the lower baffle partially protrudes into the intermediate channel, so as to guide the holder to slip along the intermediate channel; a plurality of lower salient teeth which can engage with the upper salient teeth are provided on the bottom surface of the stop fixture block and on two lateral sides of bottom surface of the holder respectively; two lateral sides of the stop fixture block and two lateral sides of the holder are provided with an upper side groove respectively; each side clamping piece is provided with homolaterally protruding lower and upper side bulges; each side clamping piece is extended into the lower and upper side grooves respectively by the lower and upper side bulges and pressed, and the upper salient teeth engage with lower salient teeth, various fixture blocks can be clamped and located in the base by various side clamping pieces.

More particularly, wherein the one-sided movable fixture block is a one-sided tilt fixture block with a plurality of movable pieces; the one-sided tilt fixture block is provided with, a plurality of oblique recesses in the intermediate section of an edge of top side of the holder; a guide slideway is provided on inner lateral side of each oblique recess; one side of each movable piece reaches into each oblique recess, and the end face of each movable piece is provided with a bevel face adhering to the guide slideway in each oblique recess; there is at least one elastic element between each movable piece and the bottom surface of each oblique recess; a downwards through fisheye long hole is located in the center of top side of each movable piece, and a plurality of driving bolts are screwed in the bottom of various oblique recesses through various fisheye long holes respectively; various driving bolts are turned to press down various movable pieces respectively, so that various movable pieces move obliquely towards the outside of various oblique recesses respectively along various guide slideways; when the driving bolts are loosened, the movable pieces can be pushed up to the home position respectively by the elasticity of various elastic elements.

More particularly, wherein an intermediate channel extending in the orientation of the fixture block group is located in the intermediate section of top surface of the base; two lateral sides of the intermediate channel are provided with a plurality of equidistantly arranged upper salient teeth; a transversely extending lower side groove is located respectively in the intermediate section of two lateral sides of the base; the center of bottom side of the holder is integrated with a lower baffle; the lower baffle partially protrudes into the intermediate channel, so as to guide the holder to slip along the intermediate channel; a plurality of lower salient teeth which can engage with the upper salient teeth are provided on the bottom surface of the stop fixture block and on two lateral sides of bottom surface of the holder respectively; two lateral sides of the stop fixture block and two lateral sides of the holder are provided with an upper side groove respectively; each side clamping piece is provided with homolaterally protruding lower and upper side bulges; each side clamping piece is extended into the lower and upper side grooves respectively by the lower and upper side bulges and pressed, and the upper salient teeth engage with lower salient teeth, so that various fixture blocks are clamped and located in the base by various side clamping pieces.

More particularly, wherein the fixture block group has a two-sided movable fixture block; the two-sided movable fixture block is a two-sided translational fixture block with two movable pieces; the two-sided translational fixture block is provided with a top surface in the upper part of holder; the two movable pieces are located on two lateral sides of the top surface, and the two movable pieces are provided with an interlocked bevel face oppositely; a driving piece is located between the two movable pieces; the driving piece has a big-end-up trapezoidal section, two opposite sides of driving piece are provided with a driving bevel face respectively; the two driving bevel faces adhere to two interlocked bevel faces respectively; there is at least one elastic element between the driving piece and the top surface of holder; a downwards through fisheye hole is located in the center of top side of the driving piece, and a through hole corresponding to the fisheye hole is located in the top surface of the holder; a screw base corresponding to the through hole is located in the lower part of the holder, and a driving bolt is screwed in the screw base through the fisheye hole and the through hole respectively; the driving bolt is turned to press down the driving piece to form a push between two movable pieces, so that the two movable pieces are translated in two opposite directions away from the driving piece; when the driving bolt is loosened, the driving piece can be pushed up to the home position by the elasticity of the elastic element.

More particularly, wherein the driving piece is provided with an outwards protruding outer hook part on two lateral sides of each driving bevel face respectively, and two movable pieces are provided with an inwards protruding inner hook part on two lateral sides of interlocked bevel face respectively; each inner hook part hooks the corresponding outer hook part, so that each interlocked bevel face adheres to the corresponding driving bevel face, and the two movable pieces and the driving piece act synchronously.

More particularly, wherein a middle groove extending along the moving path of each movable piece is located in two sides of the holder respectively, a T piece is located in the lower part of each middle groove, each T piece is screwed in the bottom side of each movable piece by a connecting bolt.

More particularly, wherein an intermediate channel extending in the orientation of the fixture block group is located in the intermediate section of top surface of the base; two lateral sides of the intermediate channel are provided with a plurality of equidistantly arranged upper salient teeth; a transversely extending lower side groove is located respectively in the intermediate section of two lateral sides of the base; the screw base partially protrudes into the intermediate channel, so as to guide the holder to slip along the intermediate channel; a plurality of lower salient teeth which can engage with the upper salient teeth are provided on the bottom surface of the stop fixture block and on two lateral sides of bottom surface of the holder respectively; two lateral sides of the stop fixture block and two lateral sides of the holder are provided with an upper side groove respectively; each side clamping piece is provided with homolaterally protruding lower and upper side bulges; each side clamping piece is extended into the lower and upper side grooves by the lower and upper side bulges and pressed, and the upper salient teeth engage with lower salient teeth, so that various fixture blocks can be clamped and located in the base by various side clamping pieces.

DETAILED DESCRIPTION OF THE INVENTION

Figure 1:
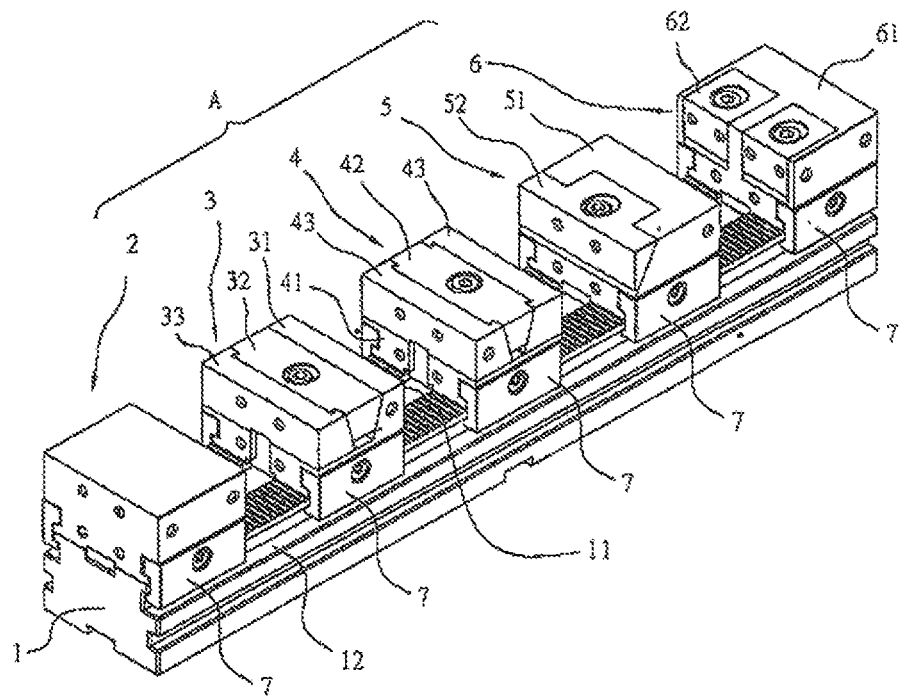
FIG. 1 is a combined outside view of the fixture block group and base of this project.
Figure 2:
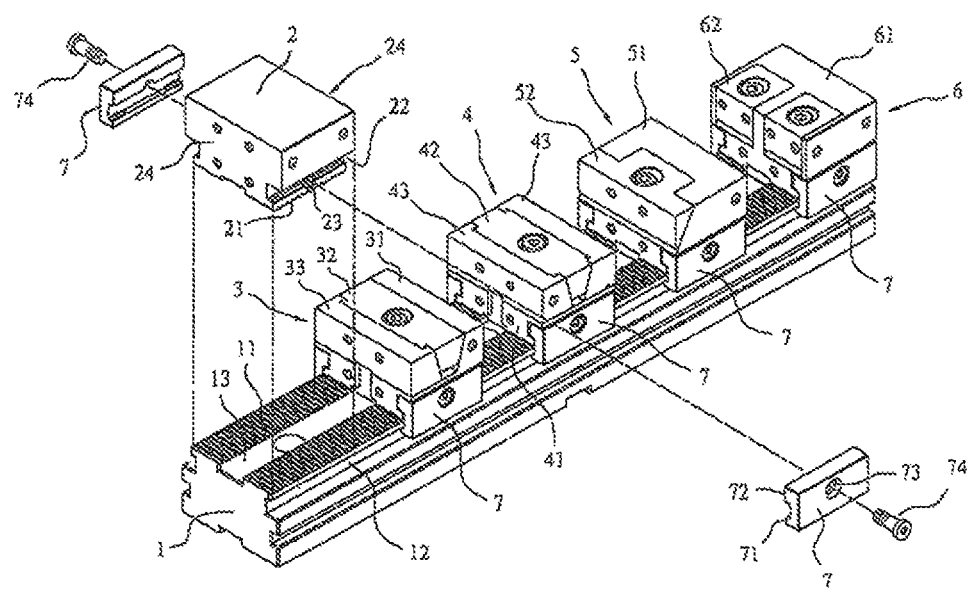
FIG. 2 is an exploded view of stop fixture block and mountings in FIG. 1.
Figure 3:
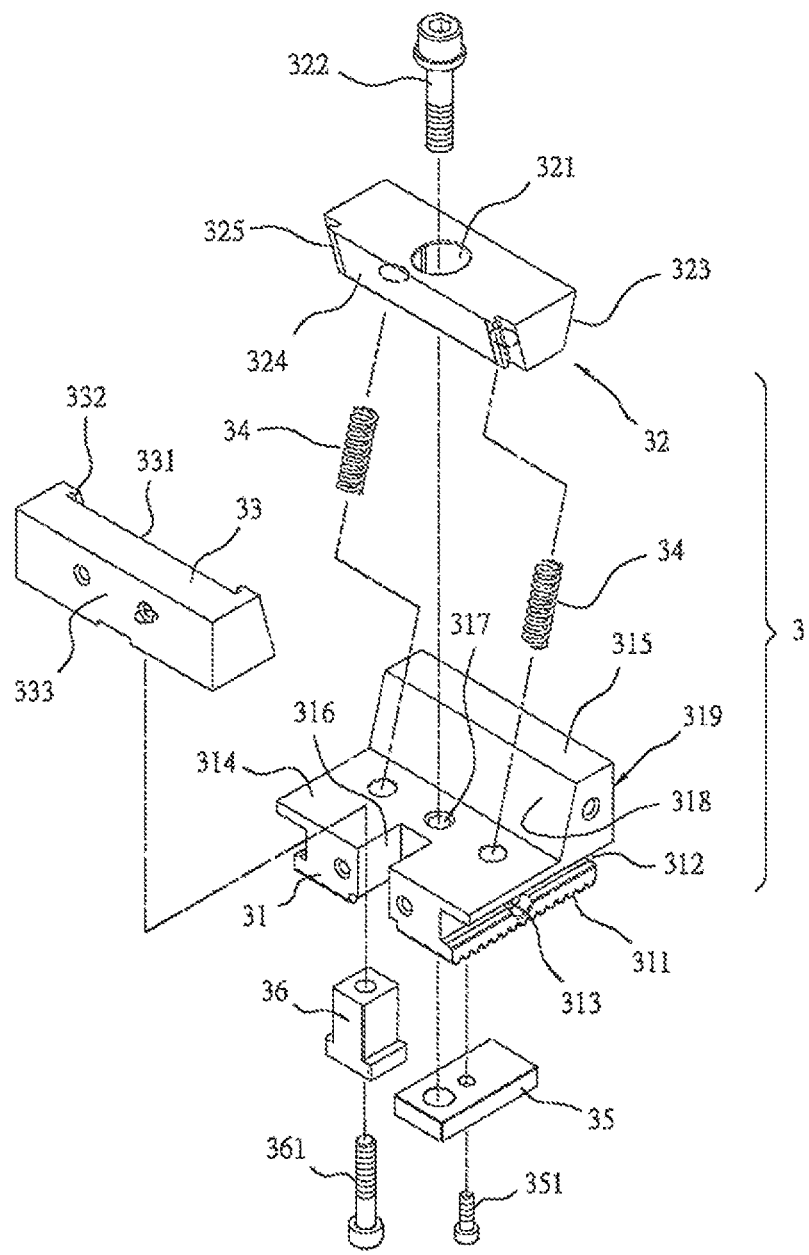
FIG. 3 is an exploded structural diagram of one-sided translational fixture block.
Figure 4:
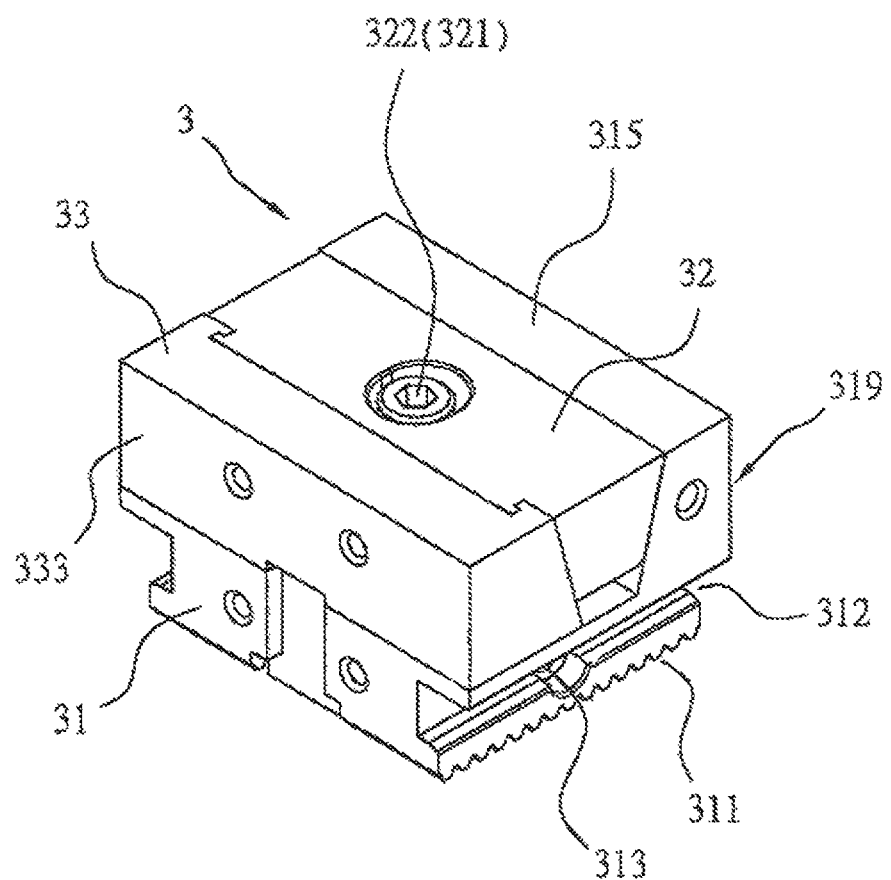
FIG. 4 is a combined outside view of one-sided translational fixture block.
Figure 5:
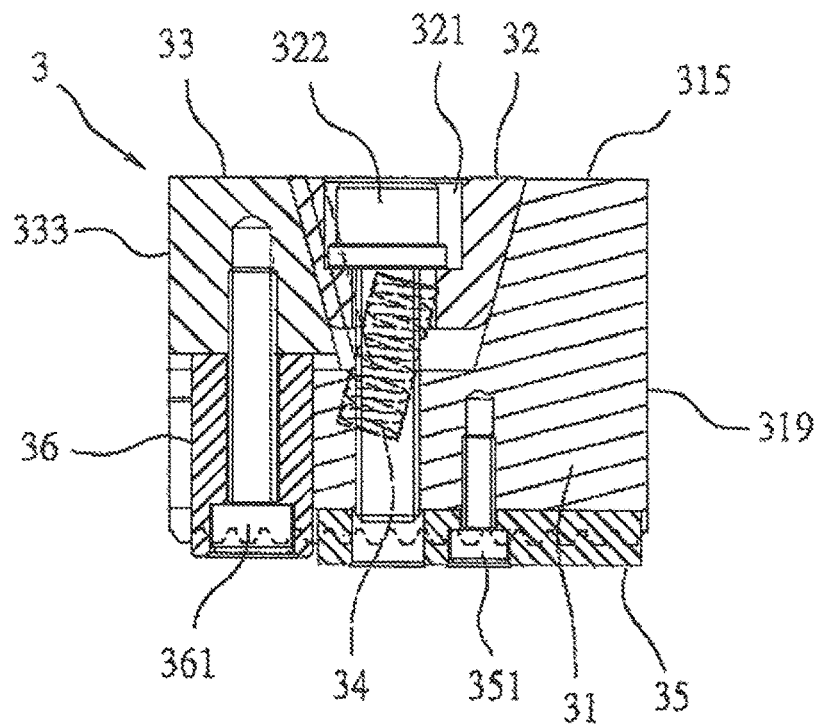
FIG. 5 is a laterally sectional view of one-sided translational fixture block.
Figure 6:
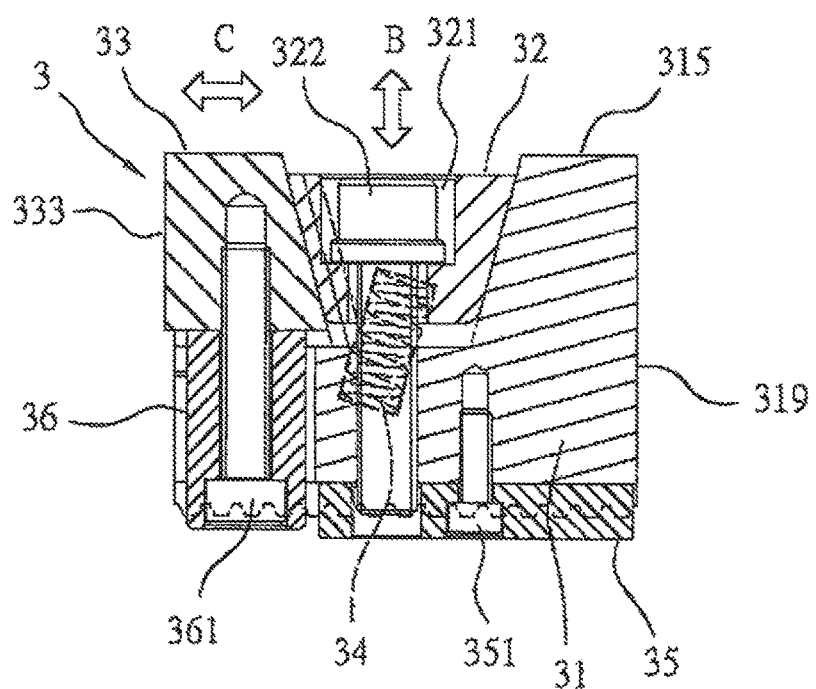
FIG. 6 is a schematic diagram of operation of one-sided translational fixture block.
Figure 7:
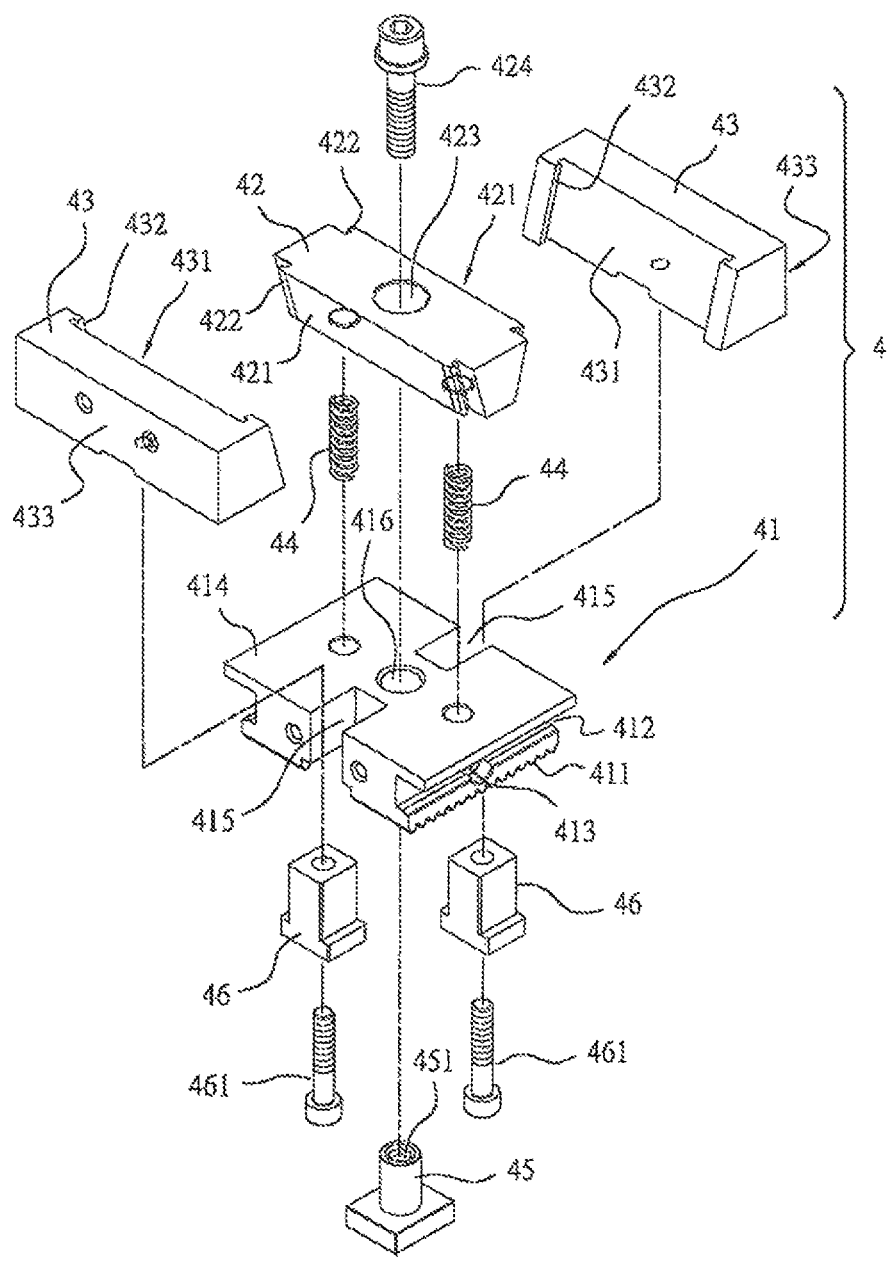
FIG. 7 is an exploded structural diagram of two-sided translational fixture block.
Figure 8:
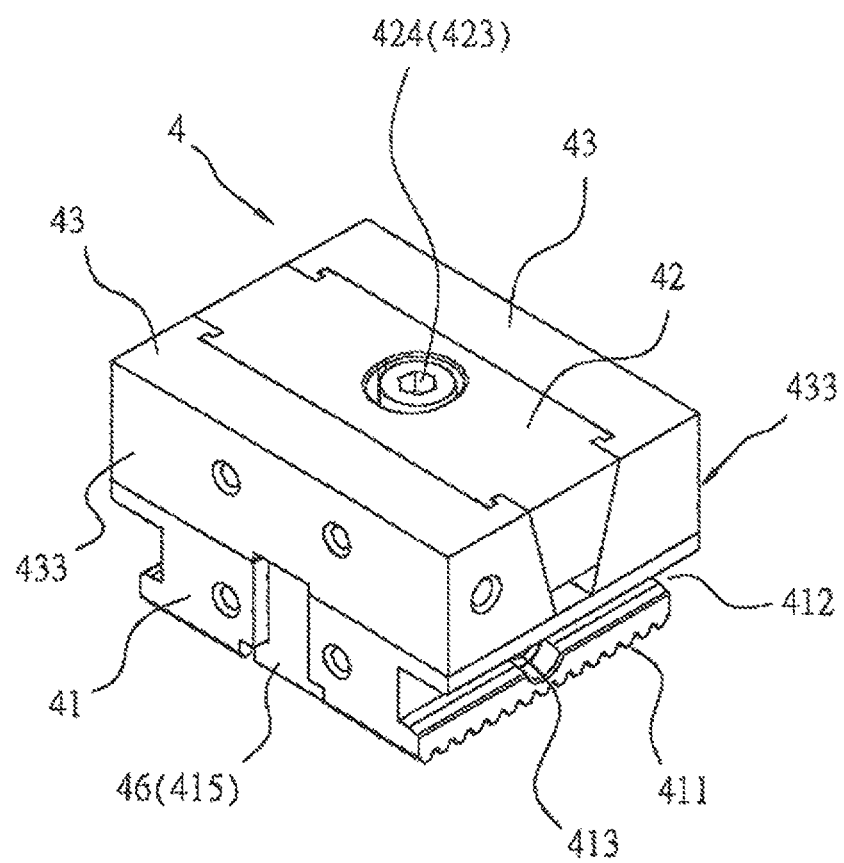
FIG. 8 is a combined outside view of two-sided translational fixture block.
Figure 9:
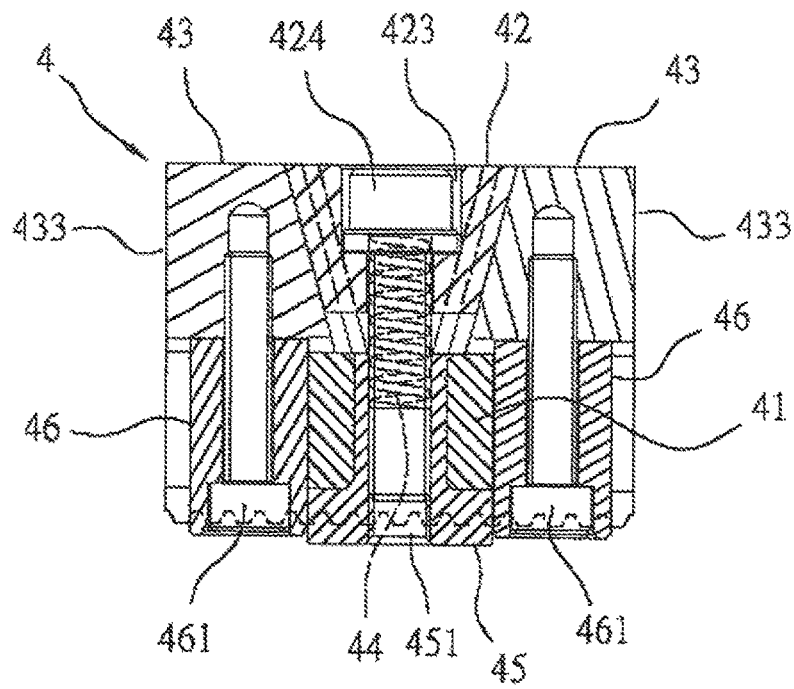
FIG. 9 is a laterally sectional view of two-sided translational fixture block.
Figure 10:
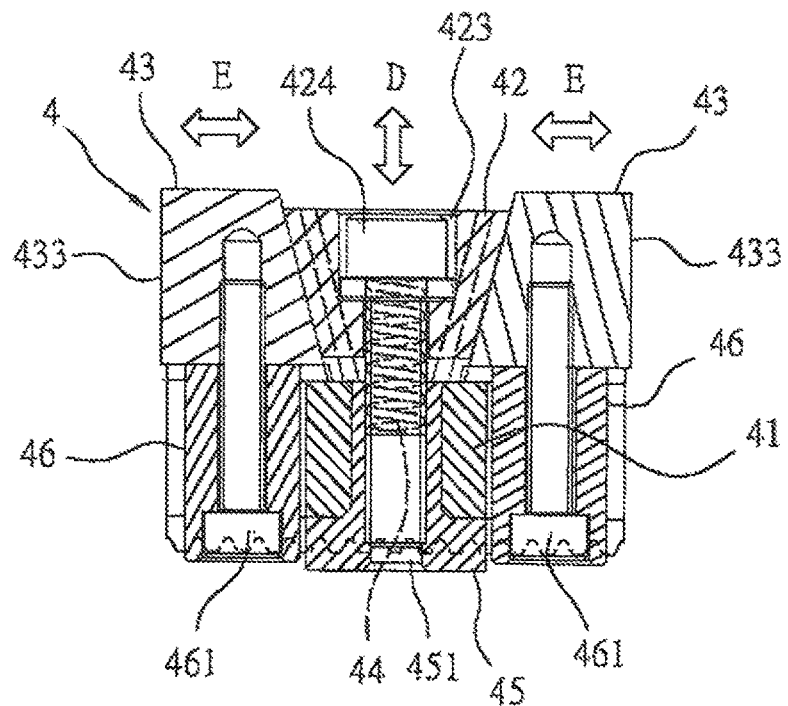
FIG. 10 is a schematic diagram of operation of two-sided translational fixture block.
Figure 11:
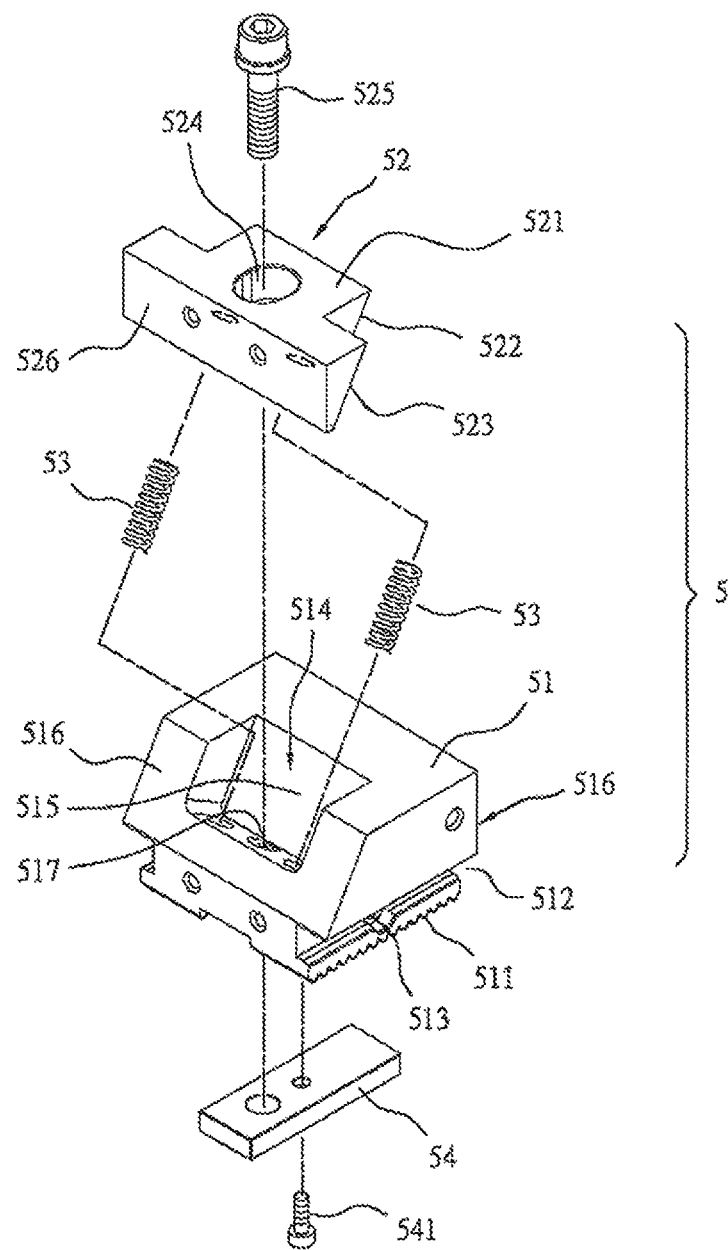
FIG. 11 is an exploded structural diagram of one-sided tilt fixture block.
Figure 12:
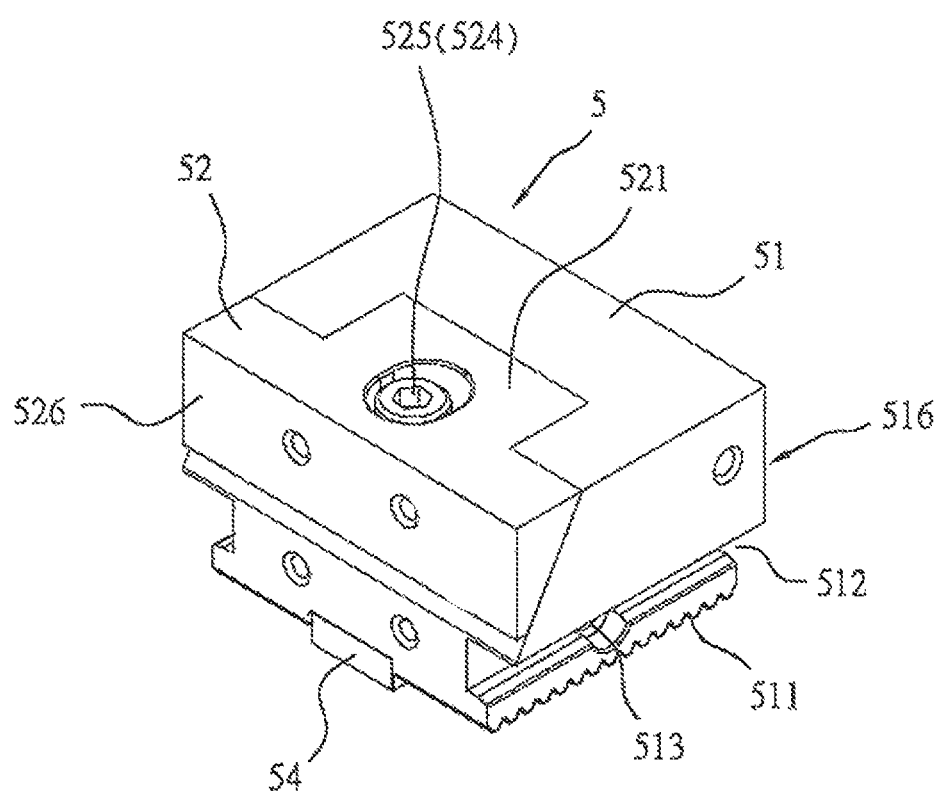
FIG. 12 is a combined outside view of one-sided tilt fixture block.
Figure 13:
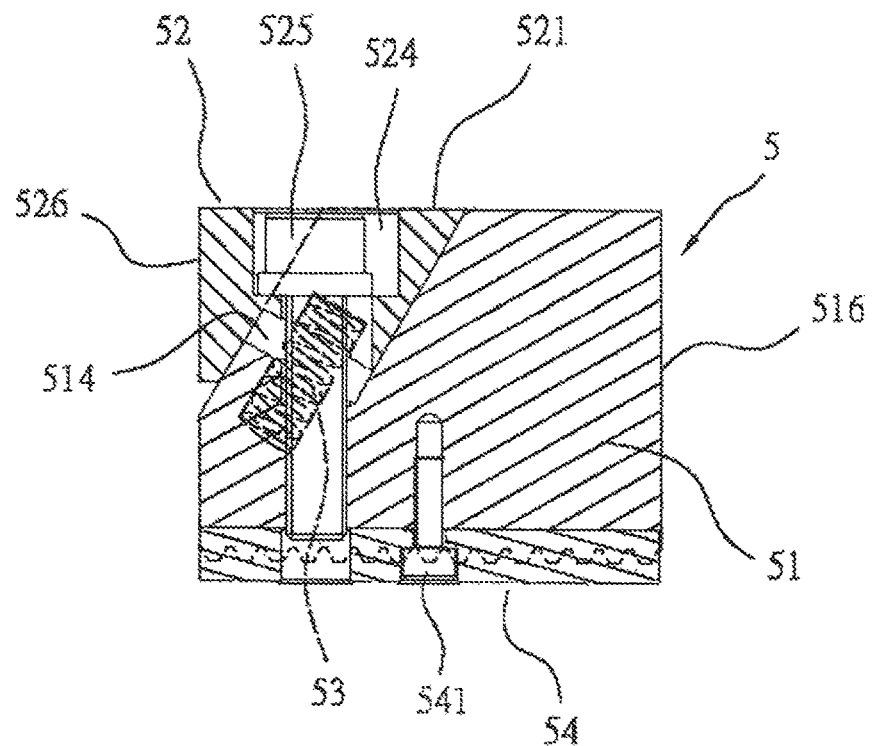
FIG. 13 is a laterally sectional view of one-sided tilt fixture block.
Figure 14:
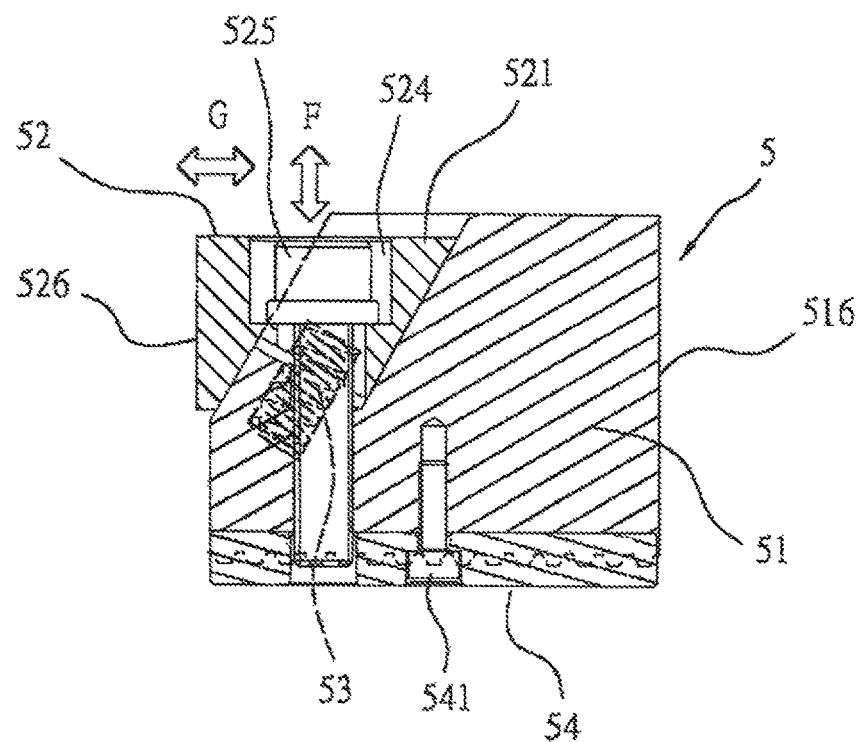
FIG. 14 is a schematic diagram of operation of one-sided tilt fixture block.

As shown in FIGS. 1 and 2, the primary structure of this project comprises a fixture block group A, the fixture block group A comprises at least a stop fixture block 2 and at least a one-sided movable fixture block, wherein the one-sided movable fixture block can be one-sided translational fixture block 3 or one-sided tilt fixture blocks 5, 6; and the fixture block group A can be provided with at least a two-sided translational fixture block 4 as required.

Said one-sided translational fixture block 3, one-sided tilt fixture blocks 5, 6, two-sided translational fixture block 4 and stop fixture block 2 can be fixed to a base 1 by a plurality of side clamping pieces 7 respectively, and a fixed upright positioning plane 24 is located respectively on two opposite lateral sides of the stop fixture block 2 in the extending direction of base 1.

An intermediate channel 13 extending in the orientation of the fixture block group A is located in the intermediate section of top surface of the base 1. A plurality of equidistantly arranged tipper salient teeth 11 are provided on two lateral sides of the intermediate channel 13. A laterally extending lower side groove 12 is located respectively in the intermediate section of two lateral sides of the base 1. A plurality of lower salient teeth 21 which engage with the upper salient teeth 11 are provided on two lateral sides of the bottom surface of the stop fixture block 2. An upper side groove 22 is located respectively in two lateral sides of the stop fixture block 2. Each side clamping piece 7 is provided with homolaterally protruding lower and upper side bulges 71, 72, each side clamping piece 7 is extended into the lower and upper side grooves 12, 22 by the lower and upper side bulges 71, 72 respectively and fastened. As the upper salient teeth 11 engage with lower salient teeth 21, the stop fixture block 2 can be clamped and located in the base 1 by the side clamping pieces 7.

In a preferred embodiment, a bolt hole 23 is located in the upper side groove 22 of the stop fixture block 2, and the side clamping piece 7 is provided with a corresponding positioning long hole 73, a positioning bolt 74 is screwed through the positioning long hole 73 in the bolt hole 23, so that the side clamping piece 7 is combined with two lateral sides of the stop fixture block 2 and clamping the base 1.

As shown in FIG. 3 to FIG. 6, the one-sided translational fixture block 3 of this project comprises a holder 31, a driving piece 32 and a movable piece 33, wherein the bottom side and two lateral sides of the holder 31 are provided with lower salient teeth 311, upper side groove 312 and bolt hole 313 respectively. The lower salient teeth 311, upper side groove 312 and bolt hole 313 are similar to the lower salient teeth 21, upper side groove 22 and bolt hole 23 of the stop fixture block 2 respectively, so that the side clamping piece 7 fixes the holder 31 to the base 1.

A top surface 314 is located in the upper part of the holder 31, a stopping part 315 protrudes from a lateral side of the top surface 314. One side of the stopping part 315 facing the top surface 314 is provided with a stopping bevel face 318. A middle groove 316 is located in the other lateral side of the top surface 314 (in the extending direction of moving path of the movable piece 33). A center bolt hole 317 normal to the top surface 314 is located between the middle groove 316 and stopping part 315. The center of bottom side of the holder 31 is integrated with a lower baffle 35 by a lower bolt 351. The lower baffle 35 partially protrudes into the intermediate channel 13, so as to lead the holder 31 to slip along the intermediate channel 13.

The movable piece 33 is located on a lateral side far from the stopping part 315 on the top surface 314, and a T piece 36 is located in the lower part of the middle groove 316. The T piece 36 is screwed in the bottom side of the movable piece 33 by a connecting bolt 361, so that the movable piece 33 can slip along the middle groove 316. One side of the movable piece 33 facing the stopping part 315 is provided with an interlocked bevel face 331. An inwards protruding inner hook part 332 is provided respectively on two lateral sides of the interlocked bevel face 331, one side of the movable piece 33 far from the stopping part 315 is provided with an upright clamping surface 333.

The driving piece 32 is located between the movable piece 33 and stopping part 315, it has a big-end-up trapezoidal section, and one side of the driving piece 32 facing movable piece 33 and stopping part 315 respectively is provided with a driving bevel face 324 and a guide slideway 323. The driving bevel face 324 and interlocked bevel face 331 bond together. An outwards protruding outer hook part 325 is provided respectively on two lateral sides of the driving bevel face 324. The outer hook part 325 hooks the inner hook part 332, so that the interlocked bevel face 331 keeps adhering to the driving bevel face 324, and the movable piece 33 and the driving piece 32 are interlocked synchronously. The guide slideway 323 adheres to the stopping bevel face 318.

A downwards through fisheye long hole 321 is located in the center of top side of the driving piece 32, and a driving bolt 322 is screwed through the fisheye long hole 321 in the center bolt hole 317 in the top surface of the holder 31, there is at least one elastic element 34 between the driving piece 32 and the top surface 314 of holder 31.

In the operation of said structure, the driving bolt 322 can be turned (in Direction B) to press down the driving piece 32, so as to push the stopping part 315 and movable piece 33, the movable piece 33 (in Direction C) is translated outwards away from the stopping part 315. The workpiece to be processed (not drawn) can be clamped as the clamping surface 333 approaches the positioning plane 24 of the stop fixture block 2. When the driving bolt 322 is loosened, the elasticity of the elastic element 34 can push the driving piece 32 upward to home position.

In a preferred embodiment, one side of the stopping part 315 of the holder 31 far from the movable piece 33 can be set as another upright positioning plane 319 as required.

As shown in FIGS. 7 to 10, the two-sided translational fixture block 4 of this project comprises a holder 41, a driving piece 42 and two movable pieces 43, wherein the bottom side and two lateral sides of the holder 41 are provided with lower salient teeth 411, upper side groove 412 and bolt hole 413 respectively. The lower salient teeth 411, upper side groove 412 and bolt hole 413 are similar to the lower salient teeth 21, upper side groove 22 and bolt hole 23 of the stop fixture block 2 respectively, so that the side clamping piece 7 fixes the holder 41 to the base 1.

A top surface 414 is located in the upper part of the holder 41. A middle groove 415 is located respectively in two opposite sides of the top surface 414 (in the extending direction of moving path of the two movable pieces 33). A through hole 416 normal to the top surface 414 is located between the two middle grooves 415. A screw base 45 with bolt hole 451 is located in the lower part of the through hole 416.

The two movable pieces 43 are located in the upper part of two middle grooves 415 of the top surface 414, and a T piece 46 is located in the lower part of each middle groove 415. Each T piece 46 is screwed in the bottom side of the two movable pieces 43 respectively by a connecting bolt 461, so that the two movable pieces 43 can slip along the two middle grooves 415 respectively. The two movable pieces 43 are provided with an interlocked bevel face 431 oppositely. Two lateral sides of the two interlocked bevel faces 431 are provided with an inwards protruding inner hook part 432 respectively. One side of each movable piece 43 far from the interlocked bevel face 431 is provided with an upright clamping surface 433.

The driving piece 42 is located between the two movable pieces 43, it has a big-end-up trapezoidal section, and one side of the driving piece 42 facing two movable pieces 33 respectively is provided with a driving bevel face 421. The two driving bevel faces 421 adhere to the two interlocked bevel faces 431 respectively. Two lateral sides of each driving bevel face 421 are provided with an outwards protruding outer hook part 422 respectively. The two outer hook parts 422 hook the two inner hook parts 432 respectively, so that the two interlocked bevel faces 431 keep adhering to the two driving bevel faces 421 respectively, and the two movable pieces 43 and the driving piece 42 act synchronously.

A downwards through fisheye hole 423 is located in the center of top side of the driving piece 42, and a driving bolt 424 is screwed in the bolt hole 451 of the screw base 45 through the fisheye hole 423 and through hole 416 in turn. The screw base 45 partially protrudes into the intermediate channel 13, so as to guide the holder 41 to slip along the intermediate channel 13. In addition, there is at least one elastic element 44 between the driving piece 42 and the top surface 414 of holder 41.

In the operation of said structure, the driving bolt 424 can be turned (in Direction D) to press down the driving piece 42, so as to push the two movable pieces 43, and the two movable pieces 43 (in Direction E) are translated oppositely. The workpiece to be processed (not drawn) can be clamped as the two clamping surfaces 433 approach the positioning plane 24 of the stop fixture block 2. When the driving bolt 424 is loosened, the elasticity of the elastic element 44 can push the driving piece 42 up to home position.

As shown in FIGS. 11 to 14, the one-sided tilt fixture block 5 of this project comprises a holder 51 and a movable piece 52, wherein the bottom side and two lateral sides of the holder 51 are provided with lower salient teeth 511, upper side groove 512 and bolt hole 513 respectively. The lower salient teeth 511, upper side groove 512 and bolt hole 513 are similar to the lower salient teeth 21, upper side groove 22 and bolt hole 23 of the stop fixture block 2 respectively, so that the side clamping piece 7 fixes the holder 51 to the base 1.

An oblique recess 514 is located in the intermediate section of an edge of top side of the holder 51. A guide slideway 515 is provided on inner lateral side of the oblique recess 514. A vertical center bolt hole 517 is located in the bottom of the oblique recess 514. The center of bottom side of the holder 51 is integrated with lower baffle 54 by a lower bolt 541. The lower baffle 54 partially protrudes into the intermediate channel 13, so as to guide the holder 51 to slip along the intermediate channel 13.

A side bulge 521 extending into the oblique recess 514 protrudes transversely from the intermediate section of one side of the movable piece 52. The side bulge 521 is provided with a bevel face 522 adhering to the guide slideway 515. One side of the movable piece 52 far from the side bulge 521 is provided with an upright clamping surface 526. There is at least one elastic element 53 between the movable piece 52 and the bottom surface of oblique recess 514. A downwards through fisheye long hole 524 is located in the center of top side of the movable piece 52, and a driving bolt 525 is screwed in the center bolt hole 517 in the bottom of the oblique recess 514 through the fisheye long hole 524.

In the operation of said structure, the driving bolt 525 can be turned (in Direction F) to press down the movable piece 52, so that the clamping surface 526 moves obliquely towards the outside of the oblique recess 514 along the guide slideway 515 with the movable piece 52. The workpiece to be processed (not drawn) can be clamped as the clamping surface 526 (in Direction G) approaches the positioning plane 24 of the stop fixture block 2. When the driving bolt 525 is loosened, the movable piece 52 can be pushed up to the home position by the elasticity of the elastic element 53.

In a preferred embodiment, one side of the holder 51 far from the oblique recess 514 can be set as another upright positioning plane 516 as required.

Figure 15:
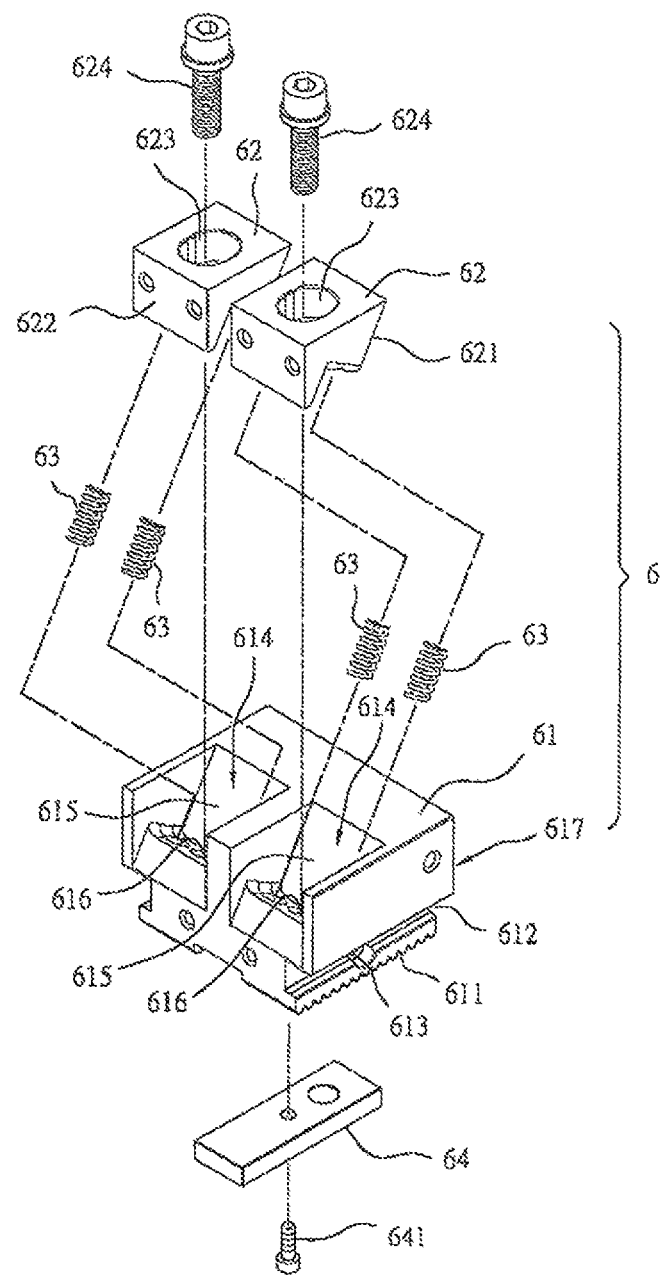
FIG. 15 is an exploded structural diagram of another one-sided tilt fixture block.
Figure 16:
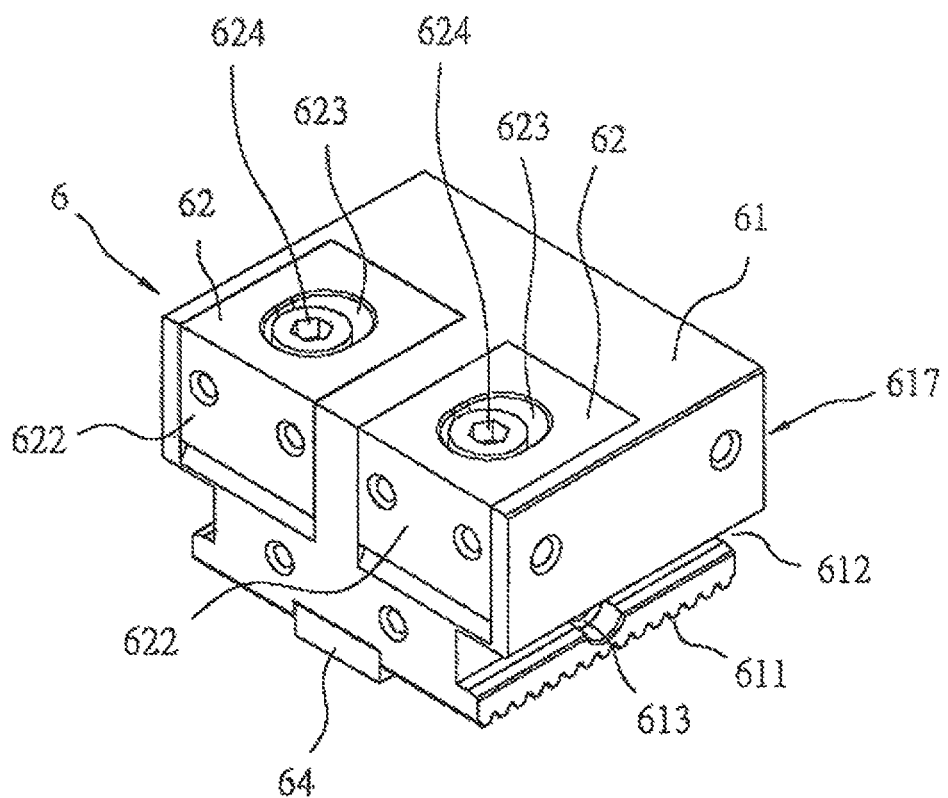
FIG. 16 is a combined outside view of another one-sided tilt fixture block.

As shown in FIGS. 15 to 16, the one-sided tilt fixture block 6 of this project comprises a holder 61 and two movable pieces 62, wherein the bottom side and two lateral sides of the holder 61 are provided with lower salient teeth 611, upper side groove 612 and bolt hole 613 respectively. The lower salient teeth 611, upper side groove 612 and bolt hole 613 are similar to the lower salient teeth 21, upper side groove 22 and bolt hole 23 of the stop fixture block 2 respectively, so that the side clamping piece 7 fixes the holder 61 to the base 1.

An edge of top side of the holder 61 is provided with two oblique recesses 614. A guide slideway 615 is provided on inner lateral side of the two oblique recesses 614. A vertical center bolt hole 616 is located in the bottom of the two oblique recesses 614. The center of bottom side of the holder 61 is integrated with a lower baffle 64 by a lower bolt 641. The lower baffle 64 partially protrudes into the intermediate channel 13, so as to guide the holder 61 to slip along the intermediate channel 13.

One side of the two movable pieces 62 reaches into each oblique recess 614 respectively, and the end face of each movable piece 62 is provided with a bevel face 621 adhering to the guide slideway 615 in each oblique recess 614. One side of each movable piece 62 far from the bevel face 621 is provided with an upright clamping surface 622. There is at least one elastic element 63 between each movable piece 62 and the bottom surface of each oblique recess 614. A downwards through fisheye long hole 623 is located in the center of top side of each movable piece 62, and a plurality of driving bolts 624 are screwed in the center bolt hole 616 in the bottom of each oblique recess 614 through various fisheye long holes 623 respectively.

In the operation of said structure, the two driving bolts 624 can be turned to press down the two movable pieces 62 respectively, so that the two clamping surfaces 622 move obliquely towards the outside of the oblique recess 614 respectively along two guide slideways 615 with each movable piece 62. The workpiece to be processed (not drawn) can be clamped as the two clamping surfaces 622 approach the positioning plane 24 of the stop fixture block 2 respectively. This structure is applicable to the workpiece with a bevel face or uneven edges. Two clamping surfaces 622 prop different positions of workpiece surface respectively to prevent workpiece tilt or unsound clamping effectively. When the driving bolt 624 is loosened, the movable piece 62 can be pushed up to the home position by the elasticity of the elastic element 63.

In a preferred embodiment, one side of the holder 61 far from two oblique recesses 614 can be s as another upright positioning plane 617 as required.

In practical application of said structure, at least one of the one-sided translational fixture block 3 and one-sided tilt fixture blocks 5, 6 of the fixture block group A can be used together with the stop fixture block 2 as required, so as to clamp one single workpiece; and multiple one-sided translational fixture blocks 3, one-sided tilt fixture blocks 5, 6 and two-sided translational fixture blocks 4 can be used jointly, so as to clamp multiple workpieces for simultaneous processing. Therefore, there can be multiple combination patterns for use, there are variability and extensive scope of application.

In said structure, the driving bolts 322, 525, 624, 424 of the one-sided translational fixture block 3, one-sided tilt fixture blocks 5, 6 and two-sided translational fixture block 4 for driving the driving piece 32, movable pieces 52, 62 and driving piece 42 keep upright against the base 1, favorable for the operation in the small space of working machine.

The above only describes some exemplary embodiments of the present invention. Those having ordinary skills in the art may also make many modifications and improvements without departing from the conception of the invention, which shall all fall within the protection scope of the invention.

I claim:

1. A fixture block composite structure for workpiece positioning comprising:
a fixture block group including at least a stop fixture block and at least a one-sided movable fixture block,
wherein the stop fixture block is fixed to a base by a plurality of side clamping pieces, and two opposite lateral sides of the stop fixture block in the extending direction of base are provided with a fixed upright positioning plane respectively; the one-sided movable fixture block has a holder, the holder is fixed to the base by a plurality of side clamping pieces; the holder is provided with a movable piece which can be driven to reciprocate towards one of the positioning planes; one side of the movable piece facing the stop fixture block is provided with a clamping surface; the clamping surface can change the distance to one of the positioning planes by reciprocating with the movable piece, so as to clamp or loosen a workpiece located between the positioning plane and movable piece;
wherein the one-sided movable fixture block is a one-sided translational fixture block with one movable piece, the one-sided translational fixture block is provided with a top surface in the upper part of the holder; a stopping part protrudes from a lateral side of the top surface; the movable piece is located on one side far from the stopping part on the top surface; a driving piece is located between the movable piece and stopping part; the driving piece has a big-end-up trapezoidal section, and one side facing the movable piece and stopping part is provided with a driving bevel face and a guide slideway respectively; the stopping part is provided with a stopping bevel face adhering to the guide slideway; there is at least one elastic element between the driving piece and the top surface of holder; the movable piece is provided with an interlocked bevel face adhering to the driving bevel face; a downwards through fisheye long hole is located in the center of top side of the driving piece, and a driving bolt is screwed in the top surface of the holder through the fisheye long hole, the driving bolt is turned to press down the driving piece, so as to form a push between the stopping part and movable piece, the movable piece can be translated away from the stopping part; when the driving bolt is loosened, the driving piece can be pushed up to the home position by the elasticity of the elastic element.

2. The fixture block composite structure according to claim 1, wherein the driving piece is provided with an outwards protruding outer hook part on two lateral sides of each driving bevel face respectively, and the movable piece is provided with an inwards protruding inner hook part on two lateral sides of interlocked bevel face respectively; the interlocked bevel face adheres to the driving bevel face as the inner hook part hooks the outer hook part, so that the movable piece and the driving piece act synchronously.

3. The fixture block composite structure according to claim 1, wherein the holder is provided with a middle groove extending along the moving path of the movable piece on one side far from the stopping part, a T piece is located in the lower part of the middle groove, the T piece is screwed in the bottom side of the movable piece by a connecting bolt.

4. The fixture block composite structure according to claim 1, wherein an intermediate channel extending in the orientation of the fixture block group is located in the intermediate section of top surface of the base; two lateral sides of the intermediate channel are provided with a plurality of equidistantly arranged upper salient teeth; a transversely extending lower side groove is located respectively in the intermediate section of two lateral sides of the base; the center of bottom side of the holder is integrated with a lower baffle; the lower baffle partially protrudes into the intermediate channel, so as to guide the holder to slip along the intermediate channel; a plurality of lower salient teeth which can engage with the upper salient teeth are provided on the bottom surface of the stop fixture block and on two lateral sides of bottom surface of the holder respectively; two lateral sides of the stop fixture block and two lateral sides of the holder are provided with an upper side groove respectively; each side clamping piece is provided with homolaterally protruding lower and upper side bulges; each side clamping piece is extended into the lower and upper side grooves by the lower and upper side bulges respectively and pressed, and the upper salient teeth engage with lower salient teeth, various fixture blocks can be clamped and located in the base by various side clamping pieces.

5. The fixture block composite structure according to claim 1, wherein the stopping part of the holder is provided with another upright positioning plane on one side far from the movable piece.

6. The fixture block composite structure according to claim 1, wherein the fixture block group has a two-sided movable fixture block; the two-sided movable fixture block is a two-sided translational fixture block with two movable pieces; the two-sided translational fixture block is provided with a top surface in the upper part of holder; the two movable pieces are located on two lateral sides of the top surface, and the two movable pieces are provided with an interlocked bevel face oppositely; a driving piece is located between the two movable pieces; the driving piece has a big-end-up trapezoidal section, two opposite sides of driving piece are provided with a driving bevel face respectively; the two driving bevel faces adhere to two interlocked bevel faces respectively; there is at least one elastic element between the driving piece and the top surface of holder; a downwards through fisheye hole is located in the center of top side of the driving piece, and a through hole corresponding to the fisheye hole is located in the top surface of the holder; a screw base corresponding to the through hole is located in the lower part of the holder, and a driving bolt is screwed in the screw base through the fisheye hole and the through hole respectively; the driving bolt is turned to press down the driving piece to form a push between two movable pieces, so that the two movable pieces are translated in two opposite directions away from the driving piece; when the driving bolt is loosened, the driving piece can be pushed up to the home position by the elasticity of the elastic element.

7. The fixture block composite structure according to claim 6, wherein in the two-sided movable fixture block: wherein the driving piece is provided with an outwards protruding outer hook part on two lateral sides of each driving bevel face respectively, and two movable pieces are provided with an inwards protruding inner hook part on two lateral sides of interlocked bevel face respectively; each inner hook part hooks the corresponding outer hook part, so that each interlocked bevel face adheres to the corresponding driving bevel face, and the two movable pieces and the driving piece act synchronously.

8. The fixture block composite structure according to claim 6, wherein in the two-sided movable fixture block: wherein a middle groove extending along the moving path of each movable piece is located in two sides of the holder respectively, a T piece is located in the lower part of each middle groove, each T piece is screwed in the bottom side of each movable piece by a connecting bolt.

9. The fixture block composite structure according to claim 6, wherein in the two-sided movable fixture block: wherein an intermediate channel extending in the orientation of the fixture block group is located in the intermediate section of top surface of the base; two lateral sides of the intermediate channel are provided with a plurality of equidistantly arranged upper salient teeth; a transversely extending lower side groove is located respectively in the intermediate section of two lateral sides of the base; the screw base partially protrudes into the intermediate channel, so as to guide the holder to slip along the intermediate channel; a plurality of lower salient teeth which can engage with the upper salient teeth are provided on the bottom surface of the stop fixture block and on two lateral sides of bottom surface of the holder respectively; two lateral sides of the stop fixture block and two lateral sides of the holder are provided with an upper side groove respectively; each side clamping piece is provided with homolaterally protruding lower and upper side bulges; each side clamping piece is extended into the lower and upper side grooves by the lower and upper side bulges and pressed, and the upper salient teeth engage with lower salient teeth, so that various fixture blocks can be clamped and located in the base by various side clamping pieces.

* * * * *